(12) United States Patent
Kawai et al.

(10) Patent No.: US 7,081,308 B2
(45) Date of Patent: Jul. 25, 2006

(54) MAGNETIC RECORDING MEDIUM

(75) Inventors: Hisao Kawai, Singapore (SG);
Teiichiro Umezawa, Tokyo (JP);
Hirotaka Tanaka, Tokyo (JP); Masaki Uemura, Tokyo (JP)

(73) Assignees: Hoya Corporation, Tokyo (JP); Hoya Magnetics Singapore Pte. Ltd., Tuas Link 2 (SG)

( * ) Notice: Subject to any disclaimer, the term of this patent is extended or adjusted under 35 U.S.C. 154(b) by 0 days.

(21) Appl. No.: 10/858,198

(22) Filed: Jun. 2, 2004

(65) Prior Publication Data
US 2004/0219394 A1 Nov. 4, 2004

Related U.S. Application Data

(63) Continuation of application No. 10/254,633, filed on Sep. 26, 2002, now abandoned.

(30) Foreign Application Priority Data
Sep. 28, 2001 (JP) .............................. 2001-304093

(51) Int. Cl.
*G11B 5/66* (2006.01)
*G11B 5/70* (2006.01)
(52) U.S. Cl. ..................................... 428/828
(58) Field of Classification Search ........ 428/694 TM, 428/694 SG, 694 ST, 900, 828, 846.9
See application file for complete search history.

(56) References Cited

U.S. PATENT DOCUMENTS

| | | | |
|---|---|---|---|
| 5,685,958 A | 11/1997 | Futamoto et al. | 204/192.2 |
| 6,537,684 B1 | 3/2003 | Doerner et al. | 428/611 |
| 6,582,758 B1 | 6/2003 | Sakawaki et al. | 427/129 |
| 6,602,612 B1 | 8/2003 | Abarra et al. | 428/611 |

FOREIGN PATENT DOCUMENTS

JP 2001-56923 2/2001

OTHER PUBLICATIONS

Machine translation of Masaya et al., JP 2001-056923, Feb. 2001.*

* cited by examiner

*Primary Examiner*—Holly Rickman
(74) *Attorney, Agent, or Firm*—Sughrue Mion, PLLC

(57) ABSTRACT

In a magnetic recording medium including a substrate (1) having a principal surface on which first and second magnetic layers (5 and 7) and a spacer layer (6) are at least formed, each of the first and the second magnetic layers being of a ferromagnetic material, the spacer layer being formed between the first and the second magnetic layers for inducing antiferromagnetic exchange interaction between the first and the second magnetic layers, the principal surface of the substrate is provided with concentric textures to have a predetermined surface roughness so that the spacer layer has a uniform thickness. The first magnetic layer is for controlling the antiferromagnetic exchange interaction.

4 Claims, 4 Drawing Sheets

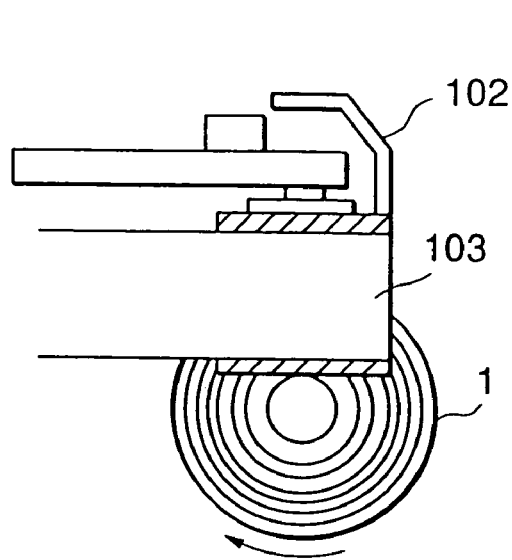
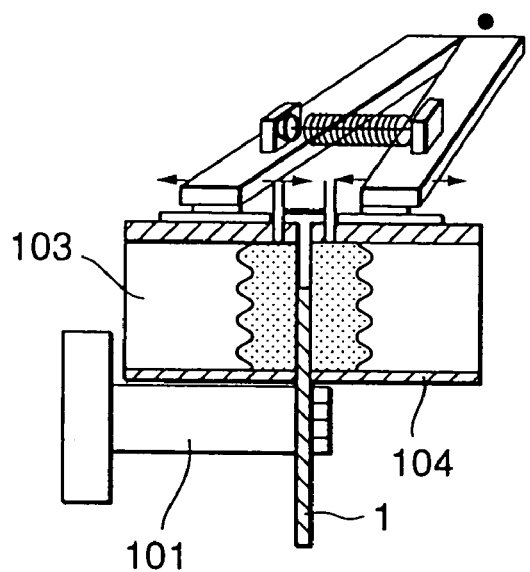
FIG. 7A   FIG. 7B
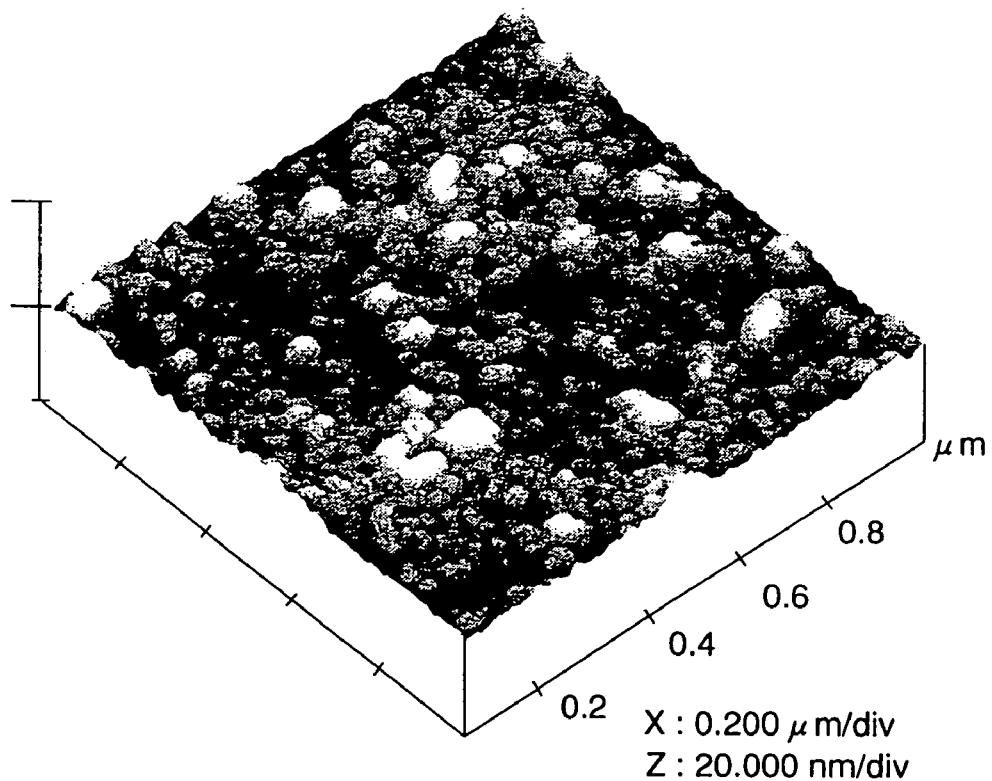
FIG. 8

MAGNETIC RECORDING MEDIUM

This is a continuation of application Ser. No. 10/254,633 filed Sep. 26, 2002 now abandoned; the disclosure of which is incorporated herein by reference.

BACKGROUND OF THE INVENTION

This invention relates to a magnetic recording medium for use with a magnetic disk apparatus for carrying out information recording and reproducing operations.

In order to achieve an increase in recording density of a HDD (hard disk drive), a decrease in medium noise is indispensable. In the past, the decrease in medium noise is achieved by improving a film structure, a film material of a magnetic recording medium, or reduction of a product Mr•t of the magnetic disk, with the help of uninterrupted improvement in output characteristics of a magnetic head. The product Mr•t is a product of residual magnetization (Mr) of a magnetic layer of the magnetic disk and a film thickness (t) of the magnetic layer of the magnetic disk.

The reduction in Mr•t is extremely effective in improving R/W (read/write) characteristics but simultaneously causes a problem of a thermal decay characteristic. The decrease in Mr•t, i.e., the decrease in film thickness of a magnetic layer brings about miniaturization of the grain size of the magnetic layer, resulting in reduction of the medium noise. However, miniaturized crystal grains no longer have a coercive force (Hc) sufficient to hold recorded magnetization as a recorded signal. This results in a phenomenon that the recorded signal is attenuated. This phenomenon is called thermal decay.

In order to prevent the phenomenon (thermal decay) that the recorded signal is attenuated, various film structures have been proposed. Attention is recently attracted to one of the film structures which is called an AFC (Anti-Ferro-Coupled-film) structure (see Japanese Unexamined Patent Publication JP 2001-56923 A).

Japanese Unexamined Patent Publication JP 2001-56923 A proposes a magnetic recording medium in which a magnetic recording layer formed on a substrate has a multilayer structure. Specifically, the magnetic recording layer is divided by a nonmagnetic separation layer (Ru, Rh, Ir, or the like) into upper and lower magnetic layers. The upper and the lower magnetic recording layers divided by the nonmagnetic separation layer have magnetizing directions antiparallel to each other. With this structure, the magnetic recording medium is excellent in thermal decay characteristic.

However, a film using the AFC structure is inevitably increased in magnetic layer thickness in total although the thermal decay characteristic is excellent. The increase in magnetic layer thickness results in a decrease in coercive force squareness ratio (S*). The increase in magnetic layer thickness also results in an increase in grain size of the magnetic layer. In this event, the medium noise (S/N ratio) is deteriorated. In addition, the output (LF (Low Frequency)) and the pulse width (PW) are deteriorated also. Thus, such recording/reproducing characteristics may fail to meet future demands for a more and more increase in recording density.

SUMMARY OF THE INVENTION

It is therefore an object of this invention to provide a magnetic recording medium which is excellent in thermal decay characteristic and in recording/reproducing characteristics such as a coercive force squareness ratio (S*), a pulse width (PW), an output (LF), and medium noise (S/N ratio).

Magnetic recording media according to this invention are as follows.

1) A magnetic recording medium comprising a substrate having a principal surface on which first and second magnetic layers and a spacer layer are at least formed, each of the first and the second magnetic layers being of a ferromagnetic material, the spacer layer being formed between the first and the second magnetic layers for inducing antiferromagnetic exchange interaction between the first and the second magnetic layers, the first magnetic layer being for controlling the antiferromagnetic exchange interaction, the principal surface of the substrate being provided with concentric (or circumferential) textures (or grooves) to have a predetermined surface roughness so that the spacer layer has a uniform thickness.

2) A magnetic recording medium as mentioned in the paragraph 1), wherein the predetermined surface roughness of the principal surface due to the concentric textures falls within a range between 1.5 nm and 10 nm, both inclusive, in a surface roughness Rmax, where Rmax is defined as a maximum height representative of a difference between a highest point and a lowest point.

3) A magnetic recording medium as mentioned in the paragraph 1), wherein a radial pitch of the concentric textures is substantially equal to a grain size of the first and the second magnetic layers.

4) A magnetic recording medium as mentioned in the paragraph 1), wherein the concentric textures have a radial pitch falling within a range between 0.005 µm and 0.05 µm (namely, between 5 nm and 50 nm), both inclusive.

5) A magnetic recording medium as mentioned in the paragraph 1), wherein the substrate is a glass substrate made of glass, the concentric textures are directly formed on a surface of the glass substrate.

In order to satisfy the glide characteristic of the medium, the substrate is generally subjected to mirror-surface polishing. In order to increase the throughput, a large amount of substrates are simultaneously polished by the use of a large-scale polishing apparatus. The surface of the substrate obtained by this technique has fine textures (protrusions) (Rmax between 2 nm and 7 nm) randomly formed.

It is to be noted here that Rmax is a surface roughness defined in Japanese Industrial Standard JIS B0601 as a maximum height representative of a difference between a highest point and a lowest point of the surface.

On the other hand, in this invention, the glass substrate has the textures (or grooves) formed on the substrate surface. Specifically, the substrate surface has a uniform plane in a track direction and textures (succession of peaks and valleys) regularly formed in a radial direction. In the anti-ferro-coupled film structure, the first and the second magnetic layers have magnetic moments anti-parallel to each other so that the thermal decay characteristic is improved. In order to achieve an ideal anti-ferro-coupled film, it is desired that, as illustrated in FIG. 1, the first and the second magnetic layers 5 and 7 are exactly parallel to each other and a spacer layer 6 interposed therebetween has a uniform thickness.

For comparison, two kinds of substrates with and without the concentric (or circumferential) textures (or grooves) were prepared and the anti-ferro-coupled film was formed on each substrate. By the use of each substrate, a magnetic recording medium was produced and tested for R/W (or read/write) characteristics. As a result, the magnetic recording medium using the substrate with the concentric textures exhibited an increase in output (LF) and coercive force squareness ratio (S*) and an improvement in pulse width (PW) as compared with the magnetic recording medium using the substrate without the concentric textures, i.e., an ordinary polished substrate. The degree of improvement is so great as existing films have never achieved. This is presumably because a combination of the anti-ferro-coupled film structure and the concentric textures provides a synergistic effect.

The mechanism of the synergistic effect is supposed as follows. The ordinary polished substrate has fine textures randomly distributed. Therefore, a film deposited thereon reflects these textures. As shown in FIG. 2, as compared with the size of a grain 71, the fine textures are not so small. In each small part of the textures, upper and lower (the first and the second) magnetic layers are parallel to each other so that the antiferromagnetic exchange interaction is established in each part. Thus, the single grain 71 acts as a sum or set of small anti-ferromagnetic couplings 61.

On the other hand, in the substrate with the concentric textures, the plane equal in size to the grain is formed in the track direction, as illustrated in FIGS. 3 and 4. Therefore, an anti-ferro-coupled film is formed throughout the size of the grain. It is supposed that such ideal anti-ferromagnetic coupling, in-plane orientation of the upper magnetic layer is improved, resulting in an increase in output (LF) and an improvement in coercive force squareness ratio (S*) and pulse width (PW). Thus, while the existing film structure is addressed to the improvement in in-plane orientation alone, the anti-ferro-coupled film can be improved not only in output (LF) and pulse width (PW) but also in thermal decay characteristic by improving the anti-ferromagnetic exchange interaction in addition to the in-plane orientation.

As far as the grains are observed by a transmission electron microscope (TEM), the shape of a pitch seems to affect the grain growth in a transversal (radial) direction. As the pitch is smaller, the grain growth in the radial direction tends to be suppressed so that the grains are smaller in size as a whole. Therefore, by appropriately adjusting the pitch of the textures, the average grain size and the variance of the grain size can be reduced. As a result, the S/N ratio can be improved. However, if the pitch is excessively small, the grains are too small so that the thermal decay characteristic is deteriorated. If the height of the textures is excessively large, a thin protection film can not completely cover the surface of the magnetic recording medium. This results in deterioration of the anticorrosion characteristic.

In this invention, the "pitch" represents a space (horizontal distance) between the peaks of the textures. In this invention, the substrate surface has the uniform plane in the track direction and the peaks and the valleys of the textures substantially regularly formed in the radial direction. The pitch represents the space (horizontal distance) between the peaks or the valleys in the radial direction.

In this invention, the surface roughness and the pitch are preferably measured by an atomic force microscope (AFM). By the use of the results measured by the AFM, it is possible to observe a fine structure or configuration of the substrate surface, in particular, a fine structure of a scale as small as a grain size.

It is believed that the textures also serve to remove impurities on the glass surface. Generally, the glass substrate before deposition of films is subjected to scrub cleaning using an alkali detergent in order to remove organic substances on the surface of the substrate. Locally, however, such cleaning may not sufficiently remove the impurities. Actually, depending upon the difference in storage location, storage period, humidity (or concentration of contaminants) in atmospheric air, the state of contamination on the surface of the substrate widely differs. The difference in surface condition of the substrate prior to cleaning is reflected on the substrate surface after cleaning.

However, by forming the textures on the substrate surface, the impurities on the substrate surface can be mechanically polished and removed. By observation using an atomic force microscope (AFM), it is seen that the substrate with appropriate textures no longer keeps the surface morphology of the glass. The removal of the impurities on the substrate brings about the uniformity in grain growth and the improvement in S/N ratio.

BRIEF DESCRIPTION OF THE DRAWING

FIGS. 7A and 7B show a texture apparatus of a tape type used in Example 1; and

FIG. 8 shows an AFM image of the surface of a glass substrate in Comparative Example 1.

DESCRIPTION OF THE PREFERRED EMBODIMENT

Now, a magnetic recording medium according to this invention will be described in conjunction with specific examples.

EXAMPLE 1

Figure 1:
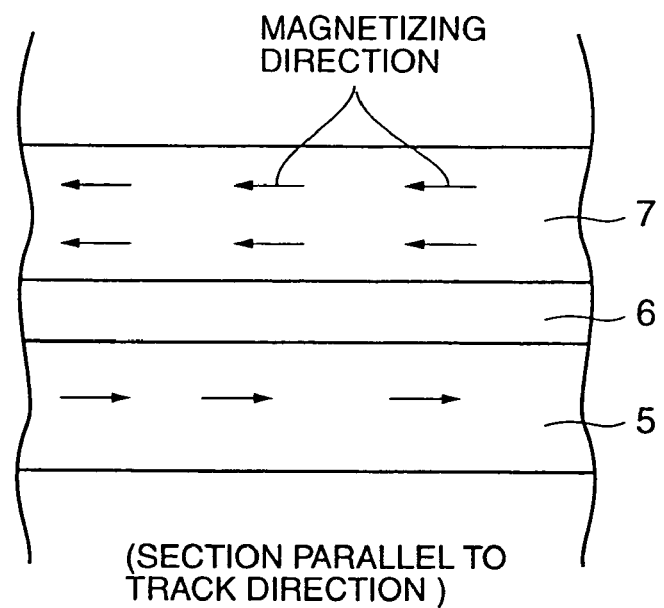
FIGS. 1 through 4 are views for describing an effect of a magnetic recording medium having an AFC structure.
Figure 2:
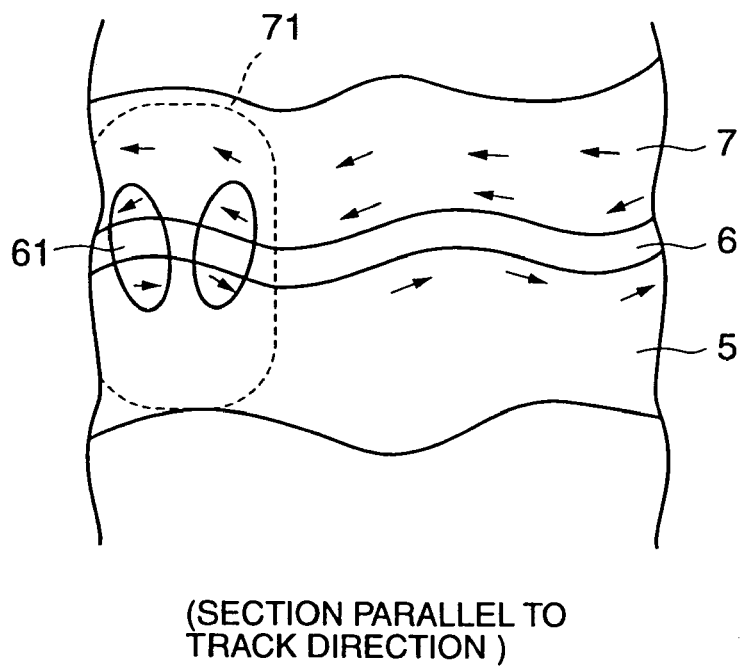
Figure 3:
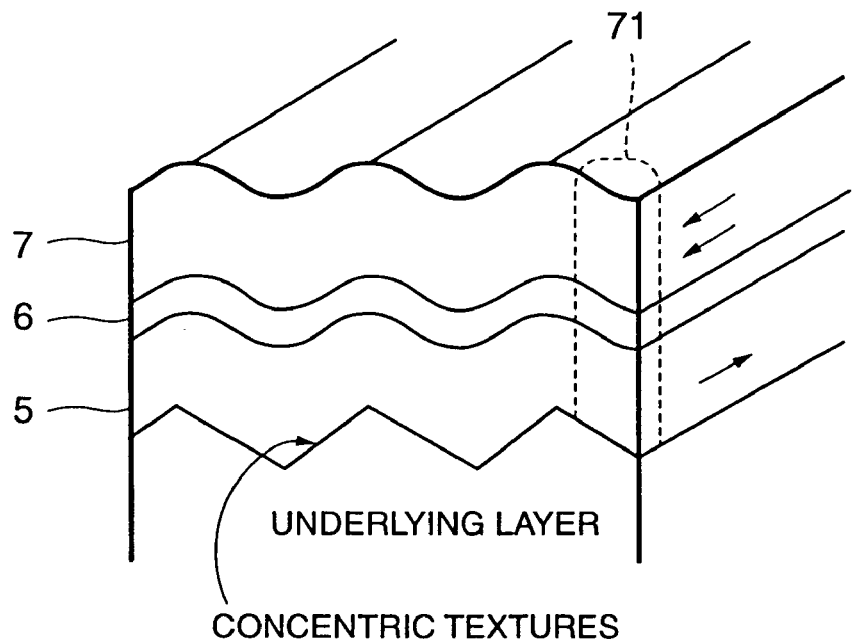
Figure 4:
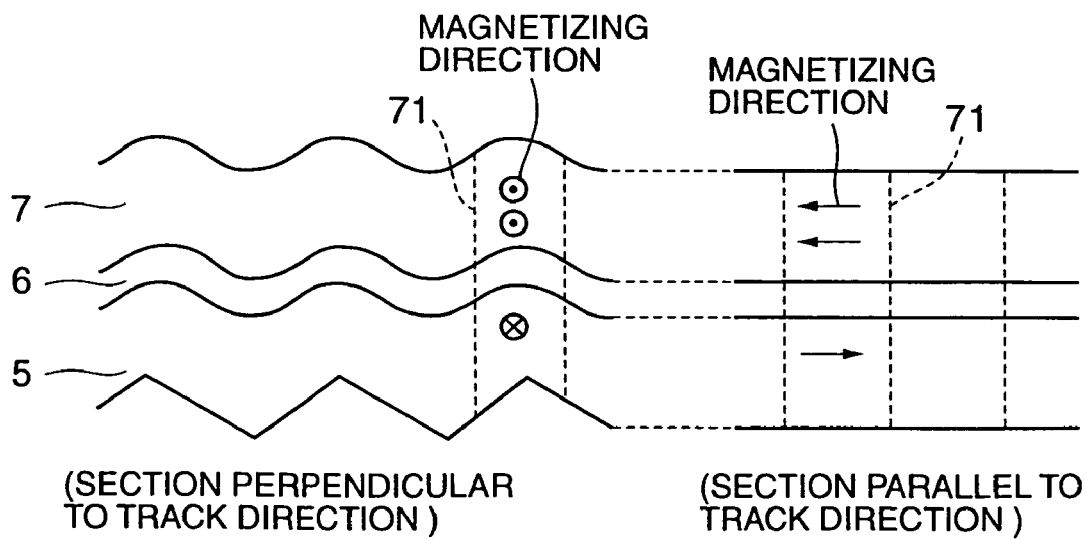
Figure 5:
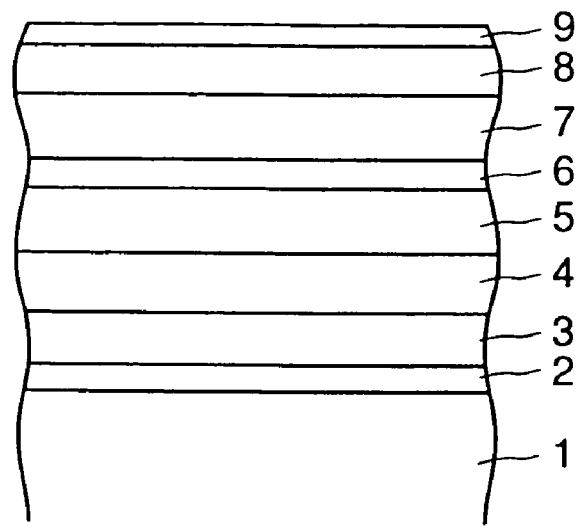
FIG. 5 shows a magnetic recording medium according to Example 1 of this invention.

Referring to FIG. 5, a magnetic recording medium according to Example 1 includes a substrate (glass substrate) 1 having a principal surface on which a precoat layer 2, a seed layer 3, an underlying layer 4, a first magnetic layer 5, a spacer layer 6, a second magnetic layer 7, a protection layer 8, and a lubrication layer 9 are successively deposited and laminated in this order. Each of the first and the second magnetic layers 5 and 7 is of a ferromagnetic material. The spacer layer 6 is formed between the first and the second magnetic layers 5 and 7 for inducing antiferromagnetic exchange interaction between the first and the second magnetic layers 5 and 7. The first magnetic layer 5 is for controlling the antiferromagnetic exchange interaction.

Figure 6:
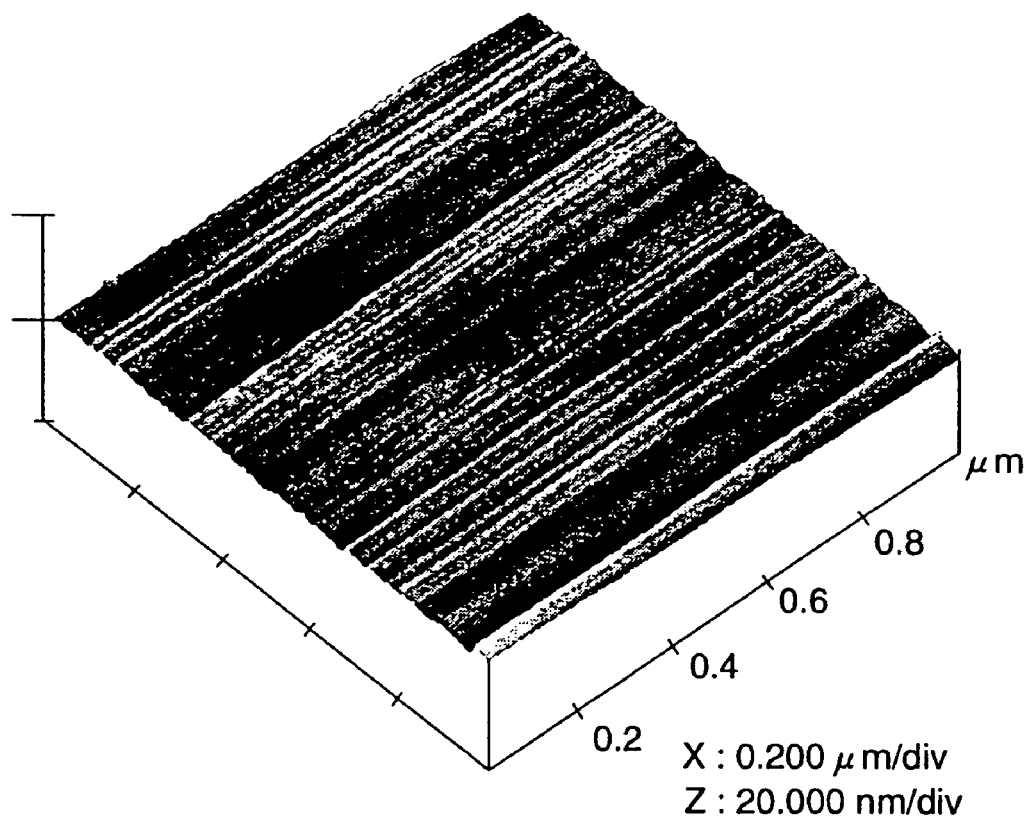
FIG. 6 shows an AFM image of the surface of a glass substrate illustrated in FIG. 5.

The principal surface of the glass substrate 1 is made of an aluminosilicate glass chemically strengthened and is provided with concentric textures or grooves having a maximum height (Rmax) of 3.4 nm and a pitch of 0.02 μm (measured by an atomic force microscope (AFM)). FIG. 6 shows an AFM image of the surface of the glass substrate 1.

The precoat layer 2 comprises a Cr alloy amorphous film (having a thickness of 300 angstroms). The seed layer 3 comprises an Al alloy thin film (having a thickness of 250 angstroms).

The underlying layer 4 comprises a CrW thin film (having a thickness of 100 angstroms) and is intended to improve a crystal structure of the first magnetic layer 5. The CrW underlying layer 4 has a composition ratio of 90 at % Cr and 10 at % W. The CrW underlying layer 4 is deposited by sputtering in a mixed gas atmosphere of 0.75% $CO_2$ and Ar in order to promote miniaturization of crystal grains of the CrW underlying layer 4.

The first magnetic layer 5 comprises a CoCr thin film (having a thickness of 25 angstroms) (Cr<22 at %) of a ferromagnetic hcp structure.

The CoCr thin film has a composition of 82 at % Co and 18 at % Cr.

The spacer layer 6 comprises a Ru film (having a thickness of 7 angstroms).

The second magnetic layer 7 comprises a CoCrPtB alloy thin film (having a thickness of 150 angstroms). The contents of Co, Cr, Pt, and B are equal to 61 at %, 20 at %, 12 at %, and 7 at %, respectively.

The protection layer 8 serves to prevent deterioration of the magnetic layer due to the contact with a magnetic head. The protection layer 8 comprises a hydrogenated carbon film having a thickness of 45 angstroms. The lubrication layer 9 comprises a liquid lubricant of perfluoro polyether and serves to buffer the contact with the magnetic head. The lubrication layer 9 has a thickness of 8 angstroms.

Next, description will be made of a method of producing the magnetic recording medium having the above-mentioned structure. At first, the glass substrate was chemically strengthened by low-temperature ion exchange. The principal surface of the glass substrate was subjected to precision polishing. Thereafter, concentric grooves (having a maximum height (Rmax) of 3.4 nm and a pitch of 0.02 μm) were formed on the principal surface by a texture apparatus of a tape type.

Referring to FIG. 7, the texture apparatus of a tape type used in Example 1 has a spindle 101 for fixedly supporting the glass substrate 1, a slurry dropping port 102 for feeding an abrasive, and a tape 103 wound around a roller 104. The glass substrate 1 fixed to the spindle 101 is rotated and the abrasive (diamond abrasive grains having an average grain size of 0.1 μm) is supplied from the slurry dropping port 102 to the tape 103. The principal surface and an opposite surface of the glass substrate are clamped by the tape 103 wound around the roller 104. Thus, the concentric grooves are formed on the principal surface of the glass substrate 1. The roller 104 with the tape 103 wound therearond is rotated at a predetermined rotation speed so that a new surface of the tape 103 is always brought into contact with the substrate 1.

Then, on the principal surface of the glass substrate 1, the precoat layer 2, the seed layer 3, the underlying layer 4, the first magnetic layer 5, the spacer layer 6, the second magnetic layer 7, and the protection layer 8 were successively deposited by the use of a static opposed sputtering apparatus. The underlying layer 4 was deposited by sputtering in a mixed gas atmosphere of $Ar+CO_2$. The protection layer 8 was deposited by sputtering in a mixed gas atmosphere of $Ar+H_2$. The remaining layers were deposited by sputtering in an inactive gas atmosphere of Ar. Then, the perfluoro polyether lubricant was applied on the protection layer 8 by dipping to form the lubrication layer 9. Thus, a magnetic disk as the magnetic recording medium was obtained.

The magnetic disk thus obtained had the coercive force (Hc) of 3474 Oe, the coercive force squareness ratio (S*) of 0.76, the output (LF) of 1.27 mV, the pulse width (PW) of 12.3 nsec, the S/N ratio of 29.9 dB, and the signal output attenuation of 0.037 -dB/decade as the thermal decay characteristic. Thus, the thermal decay characteristic was excellent. In addition, excellent results were obtained for all of the recording/reproducing characteristics including the coercive force squareness ratio (S*), the pulse width (PW), the S/N ratio, and the output (LF).

These characteristics are excellent presumably because the concentric grooves formed on the surface of the glass substrate improves the in-plane orientation of the magnetic layer and the textures contribute to suppress size distribution of magnetic grains. These characteristics were measured in the following manner. Also in following examples and comparative examples, measurement was made by the same methods.

The coercive force (Hc) and the coercive force squareness ratio (S*) were measured by a vibrating sample magnetometer (VSM). In view of the improvement in pulse width (PW) and thermal decay characteristic, the coercive force (Hc) is preferably as high as possible. The coercive force squareness ratio (S*) is an index representing in-plane orientation and magnetic isolation between the magnetic grains. Generally, a higher value is preferable.

The solitary wave reproduction output (LF) was measured by a read write analyzer (Guzik). As far as other electromagnetic conversion characteristics are maintained, the solitary wave reproduction output (LF) is preferably as high as possible in order to improve the reproduction output of a recorded signal.

The solitary wave pulse width (PW50: half width of a solitary signal waveform) was measured in the following manner. By the read write analyzer (Guzik) with an MR (magnetoresistive) head, a solitary reproduction signal was extracted. PW50 was obtained as the width of a solitary waveform at 50% of a peak value of the output signal with respect to ground (0). For a high recording density, PW50 is preferably as small as possible. This is because a smaller pulse width allows a greater number of pulses (signals) to be written in a same area. On the other hand, a greater value of PW50 causes an interference between adjacent pulses (signals) to produce an error upon reading the signal. This waveform interference deteriorates the error rate.

The S/N ratio was measured by the read write analyzer (Guzik). A magnetic head used in the measurement is a GMR (Giant Magnetic Resistance) head with a GMR reproducing device having a flying height of 20 nm. The GMR head has a write track width of 2.0 μm and a read track width of 0.5 μm. At the recording density (520 kfci), a carrier signal was recorded on the magnetic recording medium. Thereafter, medium noise from the DC frequency region to the 1.2 ×recording frequency region was monitored by the use of a spectrum analyzer. Then, the S/N ratio was calculated. Generally, the improvement of 0.5 dB in S/N ratio contributes to the improvement of 2 Gbit/inch$^2$ in recording density. A higher S/N ratio prevents occurrence of a signal reading error due to presence of the noise so that the error rate is improved and a high recording density is achieved.

The overwrite characteristic (OW) was similarly measured by the use of the read write analyzer (Guzik). The overwrite characteristic is preferably as high as possible in the sense of preventing the degradation in yield due to an insufficient writing ability of the head upon assembling the HDD.

The thermal decay characteristic was measured in the following manner. In order to accurately evaluate only the signal attenuation due to the thermal decay of the magnetic recording medium without the influence of thermal-off-track (the phenomenon such that thermal expansion of a head suspension causes deviation or offset of the magnetic head with respect to the track on the magnetic recording medium, resulting in signal attenuation), preparation is made of an MR head having a read/write device in which a write track width is at least twice a read track width. The MR head is set in a head/disk mechanism in a system together with the magnetic disk as the magnetic recording medium obtained as mentioned above. Then, the head/disk mechanism is put into an environmental tank controllable in temperature in order to expose the head/disk mechanism to a high-temperature environment. When the interior of the environmental tank is stabilized at a preselected temperature, a read/write circuit sends a write signal to the write device of the MR head to write the signal into the magnetic disk. Immediately after the signal is written, the signal written in the magnetic disk is read through the read device of the MR head, amplified by the read/write circuit, and then measured by a signal evaluating portion. The signal evaluating portion records an amplitude value of the read signal at a predetermined time interval. The signal evaluating portion carries out measurement, for example, by the use of a spectrum analyzer.

As the condition of the above-mentioned measurement, the environmental tank is kept at a temperature of 60° C. and the recording density of the signal written in the magnetic disk is 100 KFlux/inch. The MR head used in this measurement has a write track width of 2.0 μm, a read track width of 0.5 μm, a write gap length of 0.20 μm, a read gap length of 0.11 μm, and a flying height of 20 nm at a part of the read/write device.

COMPARATIVE EXAMPLE 1

Next, a magnetic recording medium was produced as Comparative Example 1 in the manner similar to Example 1 except that no concentric grooves were formed by the use of a texture apparatus of a tape type. FIG. 8 shows an AFM image of the surface of a glass substrate in Comparative Example 1. As seen from FIG. 8, protrusions are randomly formed on the glass substrate.

The magnetic disk thus obtained had a coercive force (Hc) of 3331 Oe, the coercive force squareness ratio (S*) of 0.66, the output (LF) of 1.02 mV, the pulse width (PW) of 12.9 nsec, the S/N ratio of 28.8 dB, and the signal output attenuation of 0.086 -dB/decade as the thermal decay characteristic.

It will be understood that, by forming the concentric grooves on the surface of the glass substrate as in Example 1, the magnetic disk is excellent in thermal decay characteristic and particularly improved in coercive force squareness ratio (S*), output (LF), and S/N ratio

EXAMPLES 2–4 AND REFERENCE EXAMPLES 1–2

Next, magnetic recording media were produced in the manner similar to Example 1 except that the concentric grooves have a maximum height (Rmax) of 5 nm (Example 2), 5 nm (Example 3), 10 nm (Example 4), 1.4 nm (Reference Example 1), and 11 nm (Reference Example 2). The maximum height (Rmax) of the grooves was adjusted by appropriately selecting the texturing conditions (grain size of the abrasive grains, processing pressure, and so on) of the texture apparatus of a tape type. Table 1 shows characteristics of the magnetic recording media according to Examples, Comparative Example, and Reference Examples.

As seen from Table 1, in case where the concentric grooves have a maximum height (Rmax) smaller than 1.5 nm, the surface morphology of the glass is kept so that the texture plane in the track direction is not sufficiently flat. Therefore, among the recording/reproducing characteristics, the pulse width (PW) and the S/N ratio tend to deteriorate. In case where the maximum height (Rmax) of the grooves exceeds 10 nm, the distance between the head and a part of the grains grown in valleys of the grooves. In this event, due to the insufficient writing ability of the head or the increase in noise component, the pulse width (PW) and the S/N ratio in the recording/reproducing characteristics tend to deteriorate. Accordingly, the maximum height (Rmax) of the concentric grooves formed on the substrate surface preferably falls within a range between 1.5 nm and 10 nm.

As described above, a magnetic recording medium according to this invention includes a substrate having a principal surface on which first and second magnetic layers and a spacer layer are at least formed. Each of the first and the second magnetic layers is of a ferromagnetic material. The spacer layer is formed between the first and the second magnetic layers for inducing antiferromagnetic exchange interaction between the first and the second magnetic layers. The first magnetic layer is for controlling the antiferromagnetic exchange interaction. The principal surface of the substrate is provided with concentric textures to have a predetermined surface roughness so that the spacer layer has a uniform thickness. It is therefore possible to obtain the magnetic recording medium excellent in thermal decay characteristic as well as in recording/reproducing characteristics such as the coercive force squareness ratio (S*), the pulse width (PW), the output (LF), and the medium noise (S/N).

What is claimed is:

1. A magnetic recording medium comprising a chemically strengthened glass substrate having a principal surface on which first and second magnetic layers and a spacer layer are at least formed, each of said first and said second magnetic layers being of a ferromagnetic material, said spacer layer being formed between said first and said second magnetic layers for inducing antiferromagnetic exchange interaction, said first magnetic layer being for controlling said antiferromagnetic exchange interaction, the principal surface of said substrate being provided with concentric textures to have a predetermined surface roughness so that said spacer layer has a uniform thickness, said concentric textures

TABLE 1

| | Ra [nm] | Rmax [nm] | Hc [Oe] | S* | LF [mV] | PW [nsec] | S/N [dB] | thermal decay [dB/decade] |
|---|---|---|---|---|---|---|---|---|
| Example 1 | 0.34 | 3.4 | 3474 | 0.76 | 1.27 | 12.3 | 29.9 | −0.037 |
| Example 2 Rmax = 1.5 nm | 0.18 | 1.5 | 3375 | 0.72 | 1.18 | 12.6 | 29.6 | −0.058 |
| Example 3 Rmax = 5 nm | 0.48 | 5.0 | 3422 | 0.74 | 1.21 | 12.5 | 29.7 | −0.052 |
| Example 4 Rmax = 10 nm | 0.90 | 10.0 | 3472 | 0.76 | 1.28 | 12.6 | 29.9 | −0.036 |
| Comparative Example without texture | 0.60 | 8.0 | 3331 | 0.66 | 1.02 | 12.9 | 28.8 | −0.086 |
| Reference Example 1 | 0.11 | 1.4 | 3361 | 0.72 | 1.17 | 12.7 | 29.5 | −0.063 |
| Reference Example 2 | 1.00 | 11.0 | 3368 | 0.76 | 1.29 | 12.7 | 29.6 | −0.042 | forming a plane which extends in a track direction and which is substantially equal to the grain size of said magnetic layers, said concentric textures having a radial pitch substantially equal to the grain size of said magnetic layers.

2. A magnetic recording medium as claimed in claim 1, wherein said predetermined surface roughness of the principal surface due to said concentric textures falls within a range between 1.5 nm and 10 nm, both inclusive, in a surface roughness Rmax, where Rmax is defined as a maximum height representative of a difference between a highest point and a lowest point.

3. A magnetic recording medium as claimed in claim 1, wherein the concentric textures have a radial pitch falling within a range between 0.005 μm and 0.05 μm, both inclusive.

4. A magnetic recording medium as claimed in claim 1, wherein said substrate is a glass substrate made of glass, said concentric textures are directly formed on a surface of said glass substrate.

* * * * *